Nov. 10, 1953 G. A. DEL VALLE ET AL 2,658,954

MOTION-PICTURE FILM HANDLING APPARATUS

Filed June 26, 1951 2 Sheets-Sheet 1

INVENTORS
Guillermo A. del Valle
& Alan S. Jones
BY Morris Rabkin
ATTORNEY

INVENTORS
Guillermo A. del Valle
& Alan S. Jones
BY Morris Kahn
ATTORNEY

Patented Nov. 10, 1953 2,658,954

UNITED STATES PATENT OFFICE 2,658,954

MOTION-PICTURE FILM HANDLING APPARATUS

Guillermo A. del Valle, Merchantville, and Alan S. Jones, Palmyra, N. J., assignors to Radio Corporation of America, a corporation of Delaware Application June 26, 1951, Serial No. 233,524

7 Claims. (Cl. 179—100.2)

This invention relates to motion picture apparatus, and more particularly to a signal erasing means for motion picture films bearing a magnetic sound track.

In motion picture apparatus of the type adapted for use with a film bearing a magnetic sound track, it has been found desirable to provide means for erasing or obliterating signals recorded on such sound tracks. However, when means for erasing a record are incorporated in a machine of this type, precautionary measures must be followed to prevent, or at least reduce, the probability of acidental or inadvertent erasure of a record.

It is, acordingly, an object of the present invention to provide a record erasing means for motion picture apparatus of the type adapted for use with film bearing a magnetic sound track.

It is another object of the present invention to provide a record erasing means as set forth which is characterized by means whereby the probability of an accidental or inadvertent erasure is substantially eliminated.

A further object of the present invention is to provide a record erasing attachment for motion picture apparatus of the type adapted for use with film bearing a magnetic sound track.

Yet another object of this invention is to provide an improved mounting means for magnetic heads adapted for use with magnetic records.

In accomplishing these and other objects there has been provided, in accordance with the present invention, a magnetic head assembly mounted adjacent to a lever which controls the direction of travel of the film. The head is pivotally mounted to swing in a path which intersects the path of movement of the lever. Biasing means are provided for normally holding the head at one end of its path in a "non-operate" position, catch means being provided to hold it at the other end of its path in "operate" position. When the lever is in a position to cause the film to be rewound onto a supply reel after having been unwound therefrom, the head cannot be moved to its "operate" position. Similarly, when the head is in its "operate" position, the lever cannot be moved to its "rewind" position. Thus, if a film has just been run, the previous signal erased and a new signal recorded thereon, before the film can be rewound onto its storage reel, the head must be moved to its "non-operate" position.

Figure 1:
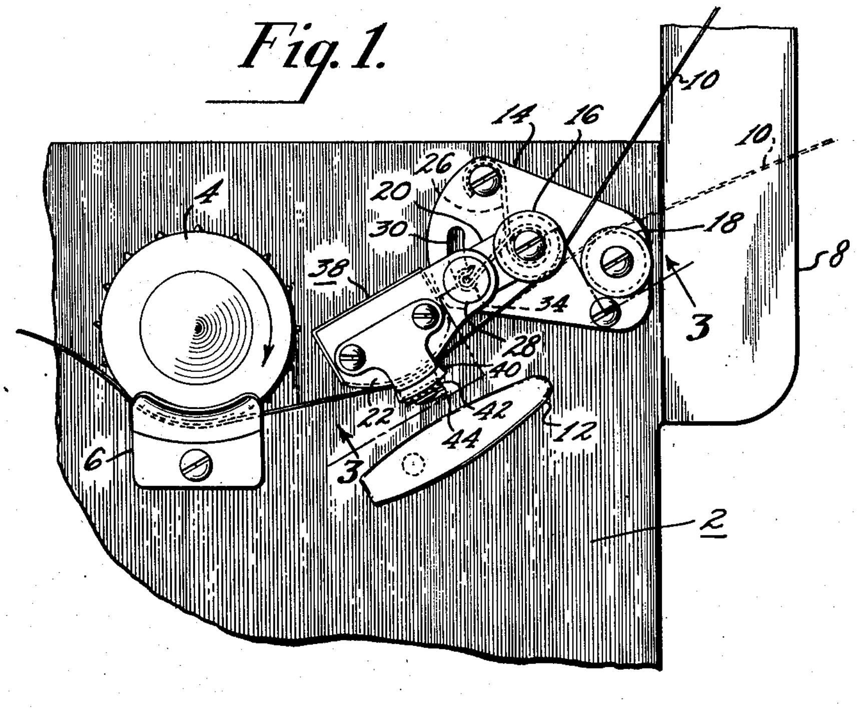
Figure 2:
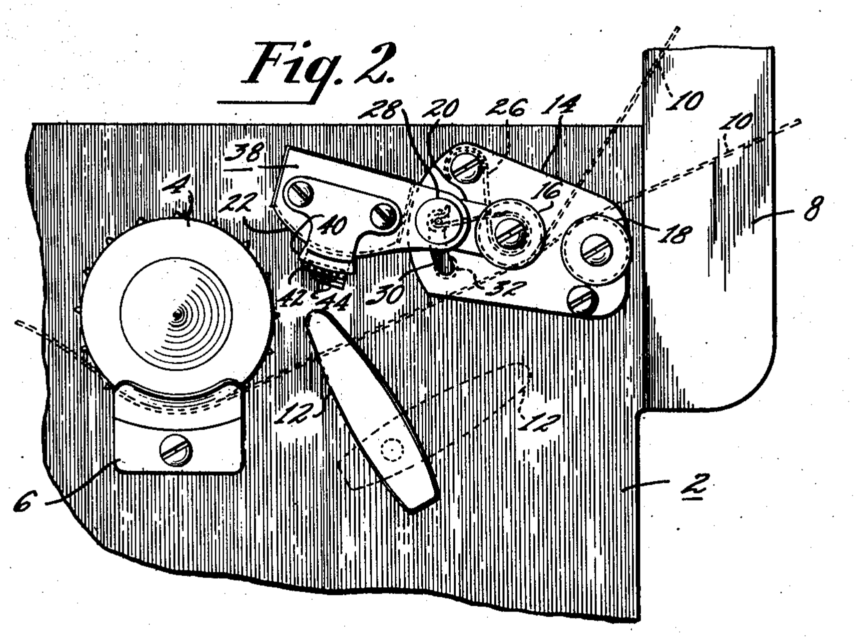
Figure 3:
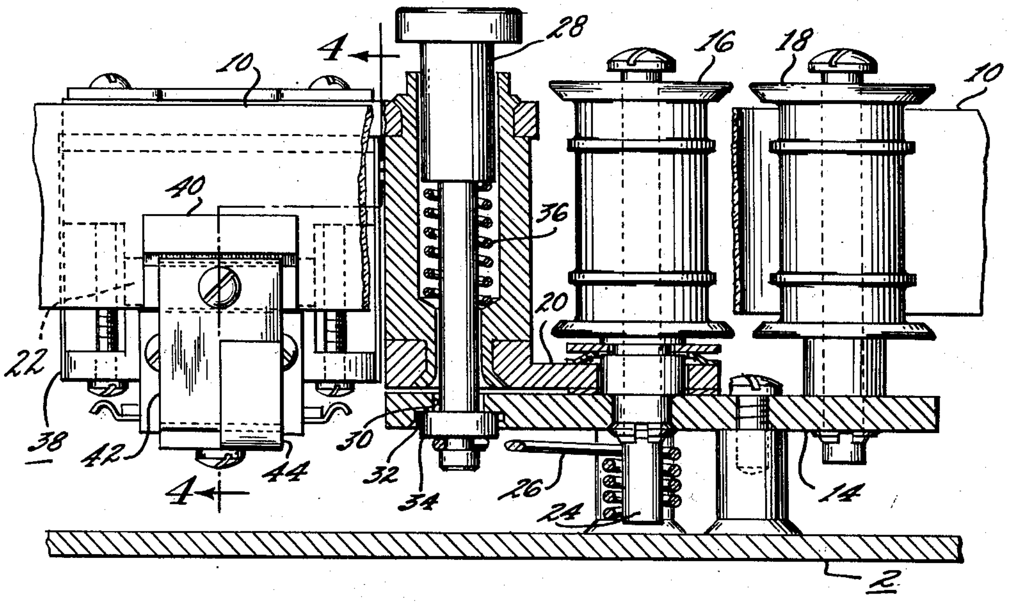
Figure 4:
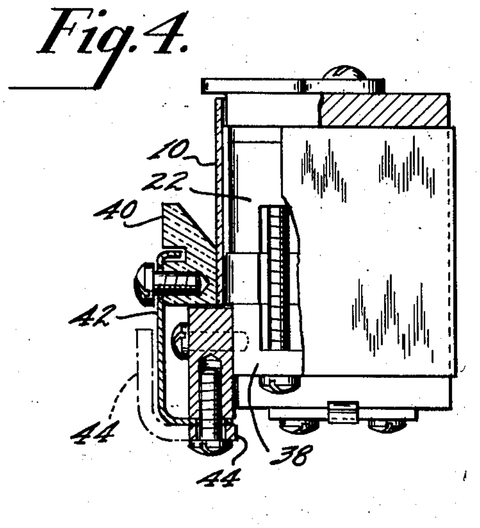

A better understanding of this invention may be had from the following detailed description when read in connection with the accompanying drawings in which:

Figure 1 is a fragmentary front view of a motion picture apparatus in accordance with the present invention and showing the head in its "operate" or film engaging position, Figure 2 is a view similar to that of Figure 1 but showing the head in its "non-operate" position, out of position to engage the film, Figure 3 is an enlarged view, partly in cross section, taken along the line 3—3 of Figure 1 and looking in the direction of the appended arrows, and Figure 4 is a view, partly in cross section, taken along the line 4—4 of Figure 3 and looking in the direction of the appended arrows.

For purposes of illustration, the invention will be described as relating to a motion picture projector.

Referring, now, to the drawings in more particularity, there is shown in Figures 1 and 2 a mounting panel 2 which may be a portion of the main body of the motion picture apparatus. A film driving sprocket 4 is carried by the panel. Adjacent to the sprocket 4, there is mounted a film guide shoe 6. An extension or arm 8 is secured to the edge of the panel. This arm carries a supply or storage reel (not shown) for a film 10. In order to control the direction in which the film is to travel, that is, either "forward" or "rewind," there is provided a lever 12 which is connected to the driving mechanism of the apparatus to effect the direction reversal. It should be remembered that, during the "rewind" cycle, the film travels directly between the two reels. In Figure 1, this lever is shown in its "forward" position. In Figure 2 the "forward" position is shown in dotted line while the solid lines show the lever in its "rewind" position.

Adjacent to the lever 12 there is mounted an erase head assembly. This assembly includes a mounting bracket 14, a pair of film guide rollers 16 and 18, a pivoted arm 20, and an erase head 22. The arm 20 carrying the erase head 22 pivots, for convenience, about the shaft 24 about which the guide roller 16 rotates. The arm 20 and the head 22 are normally biased into the position shown in Figure 2 by a spring 26. In order to hold the head assembly in its "operate" position (Fig. 1) a catch means is provided. At a point on the arm 20 between the head and the pivot point there is a plunger 28 which is carried by the arm. (See Fig. 3.) One end of the plunger extends through an arcuate slot 30 in the mounting bracket 14. The slot 30 has a recess 32 at one end thereof (the end which corresponds to the "operate" position of the head) on the rear side of the bracket. This recess is adapted to receive a washer-like member 34 carried on the end of the plunger 28 which protrudes through the bracket. A catch spring 36 surrounds the plunger and is under sufficient compression to cause the washer-like member 34 to be seated in the recess 32 whenever these two features are aligned. To release the catch, the front end of the plunger 28, which, for convenience, may terminate in a push button, is pressed. This forces the washer-like member 34 out of the recess 32, allowing the biasing spring 26 to move the head to the "non-operate" position.

The erasing head 22 is supported in a housing 38 secured to the free end of the pivoted arm 20. In order to assure a good magnetic contact between the sound track on the film 10 and the erase head 22, a pressure pad 40 disposed to exert a light pressure on the back of the film, pressing the magnetic sound track against the core of the erase head. This pad 40 may be made of any material which will not scratch the film, has a low coefficient of friction, and resists wear. A leaf spring 42 is secured, at one end, to the erase head housing 38. The other end of the spring 42 supports the pressure pad 40. The pressure pad is loosely coupled to the supporting leaf spring so that the pad may properly align itself with respect to the curved surface of the erase head.

Since the erase head 22 and the lever 12 move in intersecting, mutually interfering paths (to be more fully explained hereinafter), the leaf spring 42 may be damaged by contact with the lever. Therefore, a rigid metal guard 44 (shown in dotted line in Figure 4) is secured to the housing 38 and positioned to protect the spring.

When one desires to operate the motion picture apparatus incorporating the erase head assembly, the film 10 is threaded into the machine in the usual manner with the exception that the film is inserted between the two guide rollers 16 and 18. Assuming that the erase head is in its "non-operate" position as shown in Figure 2 during the time the film is being threaded into the machine, in order to effect the erasure of a signal on the film, the head must be manually moved to its "operate" position against the pressure of the biasing spring. A further safety feature appears at this point since the film cannot engage the erase head until the edge of the film is inserted between the erase head and the pressure pad 40. Thus, two deliberate moves are required to place the film in operating contact with the erase head. However, it must be remembered that the path of movement of the head and the path of movement of the lever 12 are intersecting paths, and that when the lever is in the position to cause the film to be rewound onto the storage reel, the head cannot be moved to its "operate" position. Therefore, a third condition is imposed, the lever must be in its "forward" position. A fourth safety feature is included in the electrical circuitry described and claimed in a copending application of Good and Putzrath, Serial No. 224,294, filed May 3, 1951 and entitled "A Sound Recording and Reproducing Circuit for Pictures." In accordance with that circuit, the erase head is only energized when the apparatus is connected to record, and is deenergized when the apparatus is connected for reproducing the signal on the sound track.

After the film has been run through the machine, assuming that the previous signal on the sound track was erased and a new signal recorded thereon during the run, the film is wound in reverse order on a take-up reel. Before the film may be run again, it must be rewound onto a storage reel to restore the proper order of the film. It is customary to rewind the film immediately after it has been run. However, in accordance with the present invention, the lever 12, which controls the direction of travel of the film, cannot be moved to its "rewind" position until the erase head has been moved out of the way to its "non-operate" position. Therefore, the danger of leaving the head in its "operate" position, through inadvertence, is eliminated.

The two guide rollers 16 and 18 are provided to assure that the film will follow a path which may be engaged by the erase head irrespective of the amount of film on the storage reel. This feature is illustrated in Figure 1 wherein the solid line representation of the film shows the path the film would follow when the storage reel is nearly empty while the dotted line representation shows the film path when the reel is nearly full.

While a particular form of catch means has been shown and described wherein the catch is released manually, other types of catches could be provided which still fall within the scope of the present invention. For example, a claw or hook type catch could be provided which, instead of being released manually, could be released by the initial movement of the lever 12, suitable interlock mechanism being included to effect the release. This interlock mechanism may include an appropriately shaped cam fixed to the shaft of the lever 12 which engages a cam follower which, in turn, effects the release of the catch.

While the present invention has been described as relating to a mounting arrangement for an erase head, it should be apparent to those skilled in the art that to mount other types of heads in the manner set forth herein would fall within the scope of the present invention. For example, a recording head, a monitoring or playback head, or a multipurpose head could be so mounted.

What is claimed is:

1. In a motion picture apparatus of the type adapted for use with film bearing a magnetic sound track and having a lever for controlling the direction of travel of said film, said lever being movable between a "forward" and a "rewind" position a magnetic head for said sound track, and means for movably mounting said head adjacent to said lever, said head being movable from an "operate" position to a "non-operate" position relative to said track, and said head and said lever being movable in intersecting, mutually interfering paths whereby said lever cannot be moved from said "forward" position to said "rewind" position until said head has been removed from said "operate" position to said "non-operate" position.

2. The invention as set forth in claim 1 characterized by the addition of guide means adjacent to said head for guiding said film in a path to be engaged by said head when said head is in its "operate" position.

3. The invention as set forth in claim 1 characterized by the addition of biasing means for normally biasing said head into its said "non-operate" position, and releasable catch means for holding said head in its said "operate" position.

4. In a motion picture apparatus of the type adapted for use with film bearing a magnetic sound track and having a lever for controlling the direction of travel of said film, said lever being movable between a "forward" and a "rewind" position an erase head for said sound track, means for movably mounting said head, and means for preventing unintentional erasure of said sound track, said last mentioned means including said lever, said head and said lever being positioned adjacent to each other and adapted to be moved in mutually interfering paths whereby said lever cannot be moved from said "forward" position to said "rewind" position until said head has been removed from said "operate" position to said "non-operate" position.

5. In a motion picture apparatus of the type adapted for use with film bearing a magnetic sound track and having a lever for controlling the direction of travel of said film, said lever being movable between a "forward" and a "rewind" position an erase head for said sound track, means for mounting said head adjacent to said lever, said mounting means including a mounting bracket and an arm pivotally supported on said bracket, said head being carried by said arm and being movable between an "operate" position and a "non-operate" position, said head and said lever being movable in intersecting, mutually interfering paths whereby said lever cannot be moved from said "forward" position to said "rewind" position until said head has been removed from said "operate" position to said "non-operate" position.

6. In a motion picture apparatus of the type adapted for use with film bearing a magnetic sound track and having a lever for controlling the direction of travel of said film, said lever being movable between a "forward" and a "rewind" position an erase head for said sound track, means for mounting said head adjacent to said lever, said mounting means including a mounting bracket and an arm pivotally supported on said bracket, said head being carried by said arm and being movable between an "operate" position and a "non-operate" position, spring biasing means for normally biasing said head into its "non-operate" position, and releasable catch means for holding said head in its "operate" position, said head and said lever being movable in intersecting, mutually interfering paths whereby said lever cannot be moved from said "forward" position to said "rewind" position until said head has been removed from said "operate" position to said "non-operate" position.

7. In motion picture apparatus of the type adapted for use with film bearing a magnetic sound track and having a lever for controlling the direction of travel of said film, said lever being movable between a "forward" and a "rewind" position an erase head for said sound track, means for mounting said head adjacent to said lever, said mounting means including a mounting bracket and an arm pivotally supported on said bracket, said head being carried by said arm and being movable between an "operate" position and a "non-operate" position, releasable catch means for selectively holding said head in its "operate" position, and guide means mounted on said bracket for guiding said film in a path to be engaged by said head when said head is in its "operate" position, said head and said lever being movable in intersecting, mutually interfering paths whereby said lever cannot be moved from said "forward" position to said "rewind" position until said head has been removed from said "operate" position to said "non-operate" position.

GUILLERMO A. DEL VALLE.
ALAN S. JONES.

No references cited.